(No Model.)
W. WATSON.
FRUIT GATHERER.
No. 390,106. Patented Sept. 25, 1888.
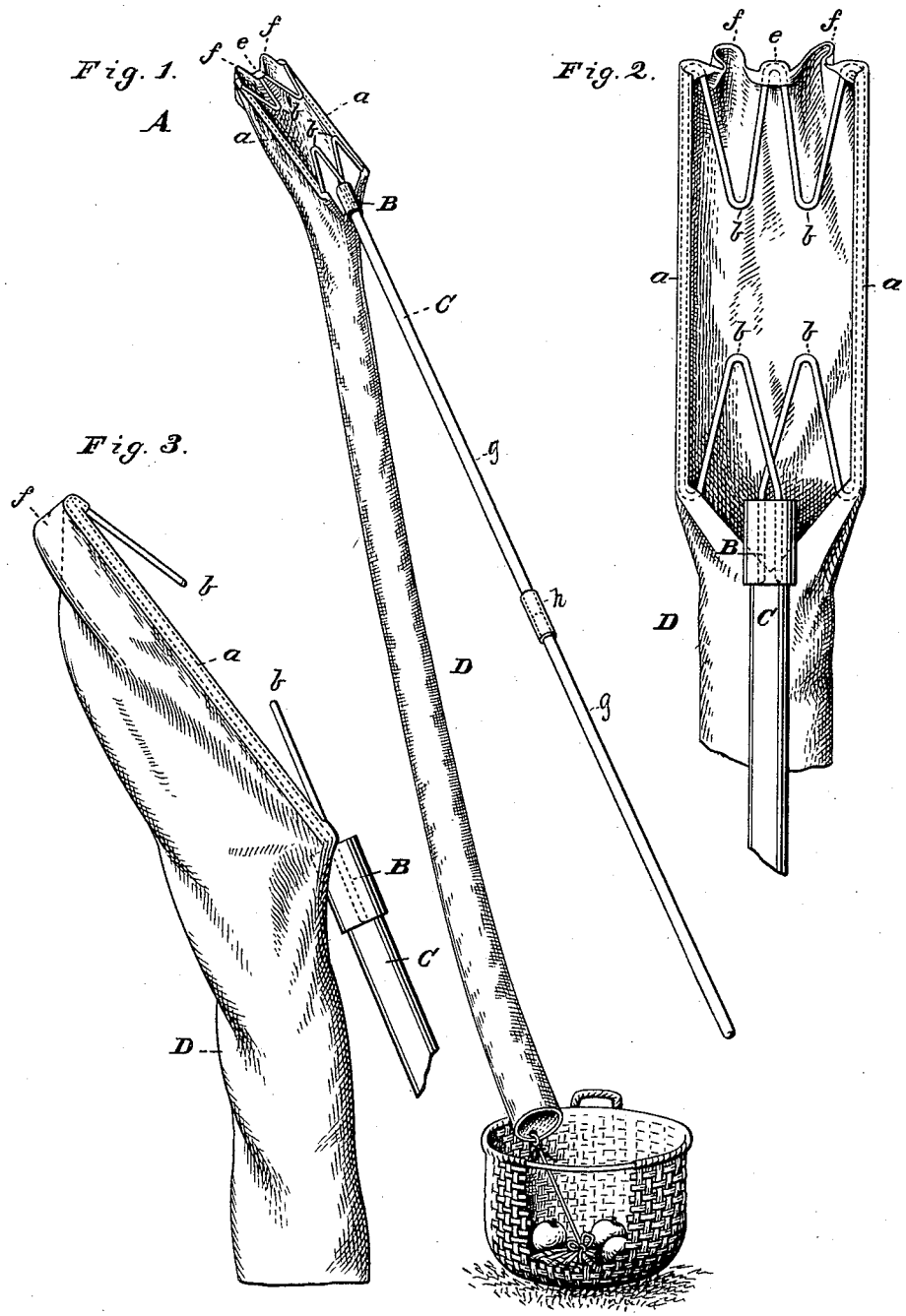
WITNESSES
Villette Anderson.
C. R. Ferguson
INVENTOR
Wheeler Watson
by E. W. Anderson
Attorney

UNITED STATES PATENT OFFICE.

WHEELER WATSON, OF STRONGS, MISSISSIPPI.

FRUIT-GATHERER.

SPECIFICATION forming part of Letters Patent No. 390,106, dated September 25, 1888.

Application filed May 16, 1888. Serial No. 274,020. (No model.)

*To all whom it may concern:*

Be it known that I, WHEELER WATSON, a citizen of the United States, and a resident of Strongs, in the county of Monroe and State of Mississippi, have invented certain new and useful Improvements in Fruit-Gatherers; and I do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1 of the drawings is a representation of this invention, and is a perspective view. Fig. 2 is a front view broken off at the bottom. Fig. 3 is a side view broken off at bottom.

The invention relates to improvements in fruit-gatherers; and it consists in the construction and novel combination of parts, as hereinafter set forth.

The object of the invention is to provide a fruit-gatherer, the main portion of which is made from a single wire bent in proper form to pick the fruit from the tree.

Referring to the drawings, A designates the fruit-gatherer, consisting of a single wire turned to form the parallel sides $a\,a$ and the inwardly and upwardly projecting fingers $b$ at the ends. The two ends of the wire are brought together and form the tang B, which is inserted into the end of the handle C. The handle C is preferably made in sections $g$, having a socket-joint, $h$, so that the handle can be extended or shortened to suit the requirements.

D is the cloth chute which directs the fruit into a basket on the ground, and I prefer to fasten the lower end of the chute to the basket by a string fastened to the center of the bottom of the basket. The upper end of the chute is enlarged and secured to sides $a\,a$ of the picker and to the return end $e$ of the fingers, which is in line with the outer ends of the sides. The edge of the chute between the end $e$ and the ends of the sides is quite loose and bags downward, as at $f$, so that fruit may enter at the bagged portion $f$ when it is more convenient to pick the fruit by an upward thrust. It will be observed that the fingers slant upwardly above the horizontal plane of the sides, so that the fruit may be brought into engagement with the fingers from the sides.

Having described my invention, what I claim is—

The fruit-gatherer consisting of the single wire forming the sides $a$, the inwardly and upwardly bent fingers, and the tang, in combination with the chute secured to the sides and to the point $e$ of the turned fingers, and hanging loosely between that point and the sides to form the bagged portion $f$, and the handle, substantially as specified.

In testimony whereof I affix my signature in presence of two witnesses.

WHEELER WATSON.

Witnesses:
J. R. HALY,
B. F. McCRARY.